United States Patent
Wu et al.

(10) Patent No.: US 6,959,339 B1
(45) Date of Patent: Oct. 25, 2005

(54) TECHNIQUE FOR HANDLING A UNIVERSAL IMAGE FORMAT ON THE INTERNET

(75) Inventors: Yau-Chen Wu, Fremont, CA (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/376,880

(22) Filed: Aug. 18, 1999

Related U.S. Application Data (60) Provisional application No. 60/107,395, filed on Nov. 6, 1998.

(51) Int. Cl.[7] .............................................. G06F 15/16
(52) U.S. Cl. ..................... 709/246; 709/217; 709/203; 707/3; 707/10
(58) Field of Search ............................... 709/246, 217, 709/219, 203; 707/3, 10, 102, 104.1

(56) References Cited

U.S. PATENT DOCUMENTS

| | | | | |
|---|---|---|---|---|
| 5,675,507 A | * | 10/1997 | Bobo, II ..................... | 709/206 |
| 5,727,159 A | * | 3/1998 | Kikinis ....................... | 709/246 |
| 5,737,592 A | | 4/1998 | Nguyen et al. | |
| 5,911,776 A | * | 6/1999 | Guck ......................... | 709/217 |
| 5,918,013 A | * | 6/1999 | Mighdoll et al. ........... | 709/217 |
| 6,041,324 A | * | 3/2000 | Earl et al. .................... | 707/10 |
| 6,092,114 A | * | 7/2000 | Shaffer et al. .............. | 709/246 |
| 6,134,598 A | * | 10/2000 | Raman ....................... | 709/246 |
| 6,144,990 A | * | 11/2000 | Brandt et al. ............... | 709/203 |
| 6,178,426 B1 | * | 1/2001 | Klein et al. ................. | 707/102 |
| 6,189,030 B1 | * | 2/2001 | Kirsch et al. ............... | 709/203 |
| 6,330,598 B1 | * | 12/2001 | Beckwith et al. ........... | 709/223 |
| 6,415,282 B1 | * | 7/2002 | Mukherjea et al. ............ | 707/3 |

* cited by examiner

*Primary Examiner*—Philip B. Tran
(74) *Attorney, Agent, or Firm*—Sughrue Mion, PLLC (57) ABSTRACT

A method, apparatus, and article of manufacture for a computer-implemented universal image format solution. Data is accessed at a server computer from a client computer connected to the server computer via a network. The data is stored on a data storage device connected to the server computer. At the server computer, a request for data is received from the client computer. It is determined whether the client computer can access the data in its stored form. When it is determined that the client computer cannot access the data in its stored form, the data is converted into a form that the client computer can access. Then, a locator is returned to the client computer for locating the converted data.

26 Claims, 4 Drawing Sheets

TECHNIQUE FOR HANDLING A UNIVERSAL IMAGE FORMAT ON THE INTERNET

PROVISIONAL APPLICATION

This application claims the benefit of U.S. Provisional Application No. 60/107,395, entitled "A METHOD FOR UNIVERSAL IMAGE FORMAT HANDLING ON THE INTERNET," filed on Nov. 6, 1998, by Yau-Chen Wu et al., which is incorporated by reference herein.

BACKGROUND OF THE INVENTION

1. Field of the Invention

This invention relates in general to computer-implemented database management systems, and, in particular, to a technique for a universal image format solution.

2. Description of Related Art

The Internet is a collection of computer networks that exchange information via Transmission Control Protocol/Internet Protocol ("TCP/IP"). The Internet computer network consists of many internet networks, each of which is a single network that uses the TCP/IP protocol suite. Currently, the use of the Internet computer network for commercial and non-commercial uses is exploding. Via its networks, the Internet computer network enables many users in different locations to access information stored in data sources (e.g., databases) stored in different locations.

The World Wide Web (i.e., the "WWW" or the "Web") is a hypertext information and communication system used on the Internet computer network with data communications operating according to a client/server model. Typically, a Web client computer will request data stored in data sources from a Web server computer, at which Web server software resides. The Web server software interacts with an interface connected to, for example, a Database Management System ("DBMS"), which is connected to the data sources. These computer programs residing at the Web server computer will retrieve the data and transmit the data to the client computer. The data can be any type of information, including database data, static data, HTML data, or dynamically generated data.

With the fast growing popularity of the Internet and the World Wide Web (also known as "WWW" or the "Web"), there is also a fast growing demand for Web access to databases. In particular, databases on the Web are often used to store images, and image browsing plays an important part in daily Internet activity. In data processing, there exist different image file formats for various application domains. However, since conventional Web browsers accommodate a limited number of image viewers, they can only handle some of the most popular image file formats, such as GIF, JPEG, etc. An advanced multimedia database, however, may contain certain images that cannot be viewed by a conventional Web browser. This inability may impact the deployment of Web-based applications.

Thus, there is a need in the art for enabling viewing of images of advanced databases from a Web browser.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented universal image format solution.

In accordance with the present invention, data is accessed at a server computer from a client computer connected to the server computer via a network. The data is stored on a data storage device connected to the server computer. At the server computer, a request for data is received from the client computer. It is determined whether the client computer can access the data in its stored form. When it is determined that the client computer cannot access the data in its stored form, the data is converted into a form that the client computer can access. Then, a locator is returned to the client computer for locating the converted data.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Universal Image Format Handling on the Internet

The Internet environment is moving from accessing a traditional data stored in a database to accessing multimedia data stored in a database. An embodiment of the present invention provides a universal image format solution for accessing multimedia data. The universal image format solution enables a user to view an image using a Web browser, regardless of the original file format of the image stored at the Web server. The universal image format solution works within the context of a global Internet environment. In particular, the universal image format solution acts as an interface between a Web browser and a Web server to respond to a Web browser with a viewable image, regardless of the image's actual file format.

Effective image browsing on the Internet is critical to enterprise data processing. An "enterprise" is a business organization that uses computers. The universal image format solution improves Web technology by making the images of enterprise databases more accessible and viewable from a Web browser. The technique of the universal image format solution is analogous to a universal adapter for different voltages for traveling in foreign countries.

This universal image format solution is applicable to a number of technologies. For example, the universal image format solution enhances the Web technology offered in the IBM Digital Library product, from International Business Machines, Corporation, Armonk, N.Y. It is useful in assisting the DB2WWW CGI gateway, as described in U.S. Pat.

No. 5,737,592 issued Apr. 7, 1998 and incorporated herein by reference, access multimedia data across the Internet more easily. The universal image format solution is particularly practical for devices having a limited memory capacity, which prevents them from installing additional image viewers. For example, some such devices include Tier-0 devices and hand-held computers, which typically come with a limited image viewer. These examples are illustrative only and are not meant to limit the invention. The concepts of the invention are applicable in many areas and to many devices.

Global Internet Environment

Figure 1:
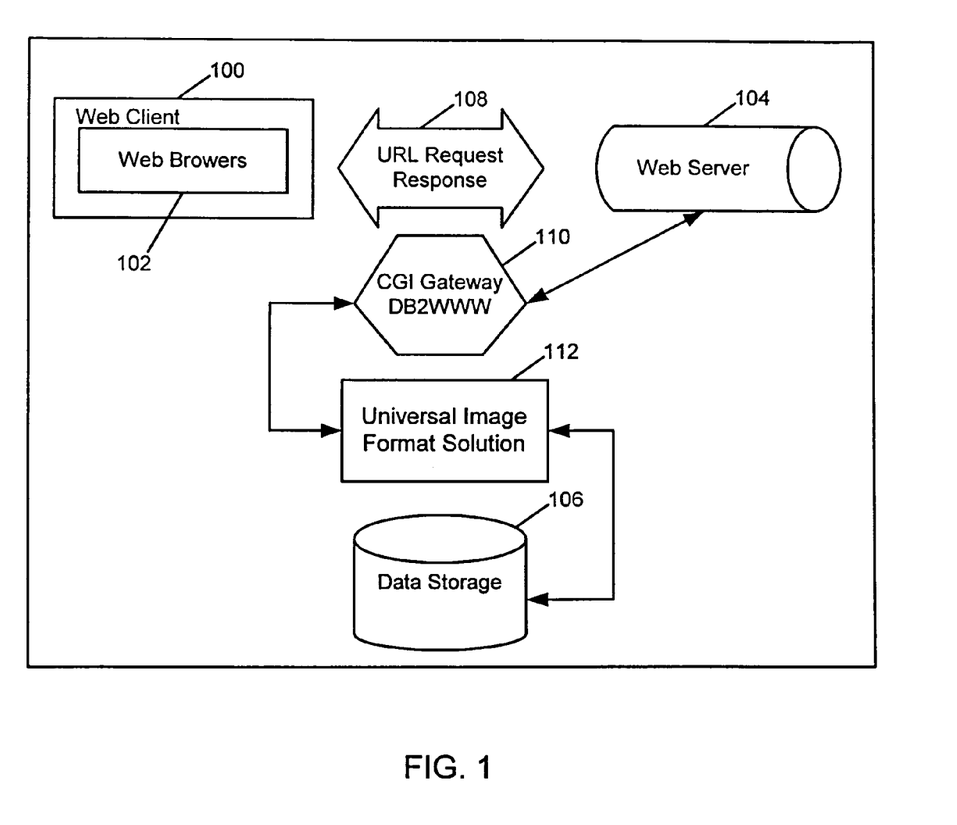
FIG. 1 is an exemplary diagram of a system environment of a preferred embodiment of the present invention, and more particularly, illustrates a global Internet environment.

FIG. 1 is an exemplary diagram of a system environment of a preferred embodiment of the present invention, and more particularly, illustrates a global Internet environment. The global Internet environment is a distributed computer system using the Internet to connect a client computer 100 executing a Web browser 102 to a Web server computer 104 executing Web software (e.g., a Web daemon) and other computer programs (e.g., a data source interface). The Internet also connects the server system 104 to a data storage 106. A typical combination of resources may include a client computer 100 that is a personal computer or workstation, and a web server computer 104 that is a personal computer, workstation, minicomputer, or mainframe. These systems are coupled to one another by various networks, such as the Internet. However, in another embodiment of the invention, the systems could be coupled to one another via networks such as LANs, WANs, SNA networks, and the Internet.

A client computer 100 typically executes a Web browser 102 and is coupled to a Web server computer 104 executing Web server software. The Web server software is typically a program such as IBM's HTTP Server or other WWW software. The Web server computer 104 also executes a data storage interface and, possibly, other computer programs, for connecting to the data storage 106. The client computer 100 is bi-directionally coupled with the Web server computer 104 over a line or via a wireless system. In turn, the Web server computer 104 is bi-directionally coupled with a data storage 106.

The Web browser 102 on the client computer 100 sends a retrieve request through a universal resource locator ("URL") 108 to a Web server 104. A URL is a global address of documents and other resources on the World Wide Web. The first part of the URL address indicates which protocol to use, and the second part of the URL address specifies the IP address (i.e., a numeric identifier for a device on the network) or the domain name (i.e., which provides an IP address using characters rather than numerals) where the resource is located. An example URL is "http:\www.ibm.com". This indicates that a page on the World Wide Web, identified as "ibm.com" should be retrieved using an HTTP protocol.

The server computer 104 executes a common gateway interface ("CGI") gateway DB2WWW application 110 to retrieve multimedia data from data storage 106 through the universal image format solution 112. The common gateway interface is a specification for transferring information between a WWW server and a CGI program. A CGI program is an program designed to accept and return data that conforms to the CGI specification. In one embodiment, the universal image format solution 112 and the CGI gateway DB2WWW application 110 are located on the same server machine on which the Web server resides.

The present invention is generally implemented in the universal image format solution 112 as one or more computer programs, which execute under the control of an operating system on a computer and perform the desired functions as described herein.

The computer programs 112 are comprised of instructions which, when read and executed by the computer, cause the computer to perform the steps necessary to implement and/or use the present invention. Generally, the computer programs 112 are tangibly embodied in and/or readable from a device, carrier, or media, such as memory, data storage devices, and/or a remote device coupled to the computer via data communications devices. Under control of the operating system, the computer programs 112 may be loaded from the memory, data storage devices, and/or remote devices into the memory of the computer for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative system environments may be used without departing from the scope of the present invention.

Universal Image Format Solution

The universal image format solution 112 is designed to handle a variety of image files through the Internet, regardless of the limitations of image viewers available on the client computer 100. The universal image format solution 112 processes a request to retrieve an image file from data storage and has the ability to convert the image file format to meet the needs on a client computer.

Figure 2:
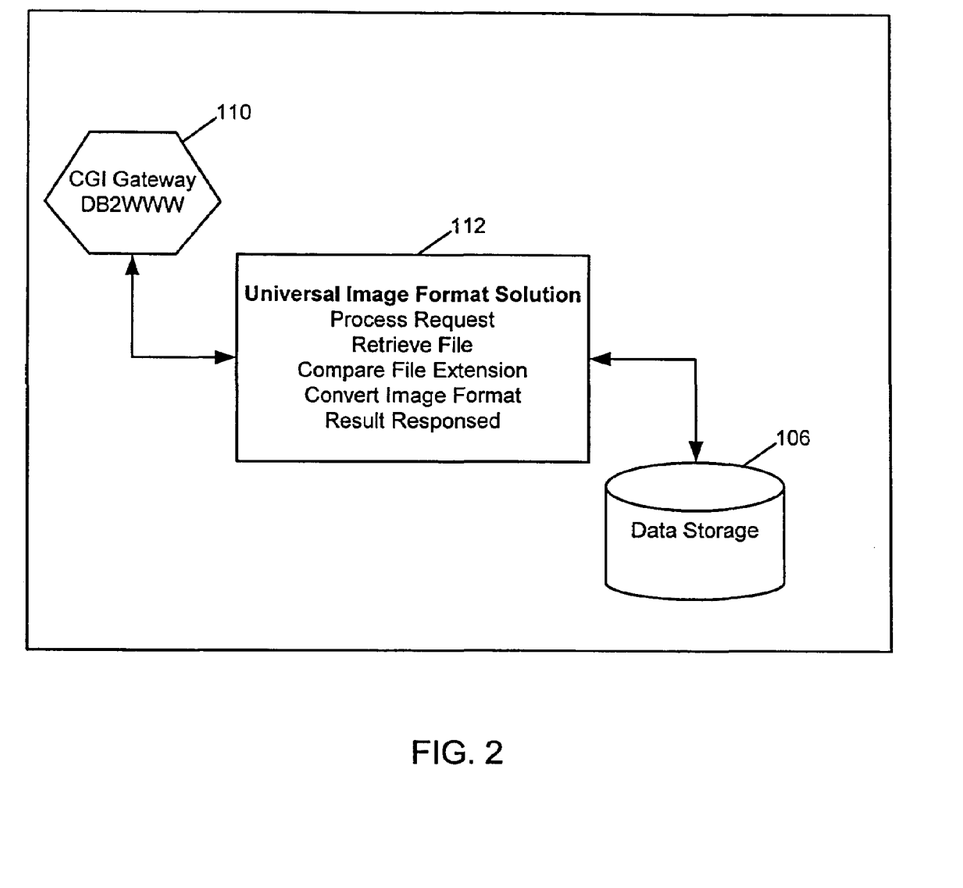
FIG. 2 is an exemplary diagram illustrating the interaction between a CGI gateway DB2WWW application and the universal image format solution.

FIG. 2 is an exemplary diagram illustrating the interaction between a CGI gateway DB2WWW application 110 and the universal image format solution 112. The CGI gateway DB2WWW application 110 passes the URL request (e.g., URL command) to the universal image format solution 112 to retrieve and process an image file from data storage 106. The URL request is used to invoke the CGI gateway DB2WWW application 110 with a macro language file which contains a language environment reserve word (e.g., DTW_DLDPB) to indicate that a DB2WWW application should communicate with the universal image format solution 112. The universal image format solution 112 processes the request to retrieve the image file identified in the request. Then, the universal image format solution 112 compares the file extension on the image file with an extension the Web browser 102 understands. The universal image format solution 112 can convert the image file into a format understood by the Web browser 102, if necessary. Then, the universal image format solution 112 responds to the CGI gateway DB2WWW application 110, which in turn transfers the information to Web server 104. Then, the Web server 104 transfers the response to the Web browser 102 via a URL 108.

The universal image format solution 112 performs the following steps. Initially, the universal image format solution 112 processes a URL request. The URL request specifies the image to be retrieved using a unique identifier for the file object. Additionally, the URL request may identify the default viewer format at the Web browser 102. The universal image format solution 112 uses this information to retrieve the file object from data storage 106 based on unique identifier. Then, the universal image format solution 112 compares the file extension of the file object that was retrieved with the default viewer format, if provided by the URL request.

The universal image format solution 112 converts the file object to the format of the default viewer at the Web browser 102. In particular, the universal image format solution 112 applies the file conversion, stores the converted file object in the local cache, and generates a file name (i.e., locator) for the converted file with the file name being a full path name for use by the Web browser 102. The universal image format solution 112 responds to the Web browser 102 with the path name. The Web browser 102 accesses the stored file object and displays the file object at the client computer 100. In one embodiment of the invention, the converted file object, stored at the server, may be deleted after a specified period of time to avoid storage of converted files that may be needed infrequently but that use valuable storage space.

The universal image format solution 112 is used when the CGI gateway DB2WWW application 110 detects a function call, which executing language environment DTW_DLDPB is shown in the macro language file.

The following is exemplary macro file used to retrieve an image with a user specified file extension option. The first portion, starting with %FUNCTION(DTW_DLDPB) RetrieveImage (in PID), is a function declaration of RetrieveImage. The second portion, starting with <HTML> %INCLUDE_URL "http://$(SERVER)/dlcprite.html", is the HTML body that invokes the RetrieveImage function with a DP_ItemID parameter.

```
%FUNCTION(DTW_DLDPB) RetrieveImage (in PID)
{
  DP_Retrieve;
  DP_THUMBID=$(DP_PartID);
    DP_IMAGENAME=$(DP_FileName);
    %REPORT{
      %ROW{
        @DTW_ASSIGN(frame_image,V1)
      %}
    %}
%}
%HTML(retrieve) {
<!***********************************
    ***************!>
<HTML>
%INCLUDE_URL "http://$(SERVER)/dlcprite.html"
%INCLUDE_URL "http://$(SERVER)/dlheader.html"
@IF (DP_PartID=="")
  @DTW_ASSIGN(DP_PartID,"4")
%ENDIF
@RetrieveImage(DP_ItemID)
<BODY background="back2.gif">
<BASEFONT SIZE="4">
<IMG SRC="masthead.gif">
<br><br>
<center>
<img src="$(frame_image)">
<br><br>
</center>
</body>
<hr noshape>
%INCLUDE_URL "http://$(SERVER)/dlfooter.html"
</HTML>
```

In the RetrieveImage function, DP_Retrieve indicates that processing should continue with the HTML portion of the macro file to retrieve an image. The images are stored in files on a database. The file is considered an object that is part of a collection of parts. Therefore, DP_THUMBID=$ (DP_PartID) identifies the file with a part identifier.

DP_IMAGENAME=$(DP_FileName) gives the name of file containing the image. DTW_ASSIGN (frame_image,V1) is a macro that assigns a value to a variable designated as "V1". The image source, which is "V1", is identified with <img src = "$(frame_image)"> in the HTML section.

In the HTML portion, RetrieveImage(DP_ItemID) is a method called by a URL.

The following is an exemplary URL command to invoke the function from Web browser:
http://zebra/fcgi-bin/db2www/dpb015.d2w/retrieve?
DP_ItemID=DG7P1$2GWR$636NP&
DP_PartID=4_FileName=aa.gif In the above URL command, DP_ItemID=DG7P1$2GWR$636NP& DP_PartID=4 specifies a document identifier for documents stored in the Digital Library. In the aa.gif portion of the FileName, "aa" is the name of the image file and "gif" is the requested extension for the file.

The language environment DTW_DLDPB is a macro language interface between the universal image format solution 112 and the CGI gateway DB2WWW application 110. With the DTW_DLDPB language environment interface, the CGI gateway DB2WWW application 110 is able to route the request to the universal image format solution 112 and return the result received back from the universal image format solution 112.

A user can search a specific image file with a specific viewer by passing the unique identifier of the image file and a default file extension (i.e., one that the specific viewer can display) as parameters in a URL request.

The following is an exemplary URL request:
HTTP://<server-machine>/<cgi-name>/<db2www-CGI-gateway>/<macro-file>/<html-section>/?<unique-id>&<default-file-extension>

The <server-machine> identifies the server computer on which the Web server 104 resides. The <cgi-name> specifies a CGI reference guide Web server that executes the CGI program. The <db2www-CGI-gateway> specifies a CGI gateway DB2WWW application 110 executable. The <macro-file> specifies a macro language file that contains HTML section and macro language syntax. The <html-section> specifies a HTML page. The <unique-id> specifies a unique identifier for searching for an image file. The <default-file-extension> specifies a file extension for the available image viewer at the Web browser 102.

The universal file format solution 112 processes the URL request by using the <unique-id> provided to identify an image file. The universal file format solution 112 confirms that the <unique-id> specifies an existing, valid image file using a process request function. If the <unique-id> specifies an existing, valid image file, the universal file format solution 112 proceeds to retrieve the image file. Next, the universal file format solution 112 performs a file extension comparison of the image file to be retrieved and the default format requested. If the comparison indicates that the extensions do not match, the universal file format solution 112 proceeds with converting the image file to the default format. The universal file format solution 112 stores the content of the converted image file in a local disk of the server computer. The universal file format solution 112 generates a file name for the converted file and returns the file name of the converted image file to the macro file and builds the complete HTML page to be sent back to the client computer 100 on which the Web browser 102 is located.

Figure 4:
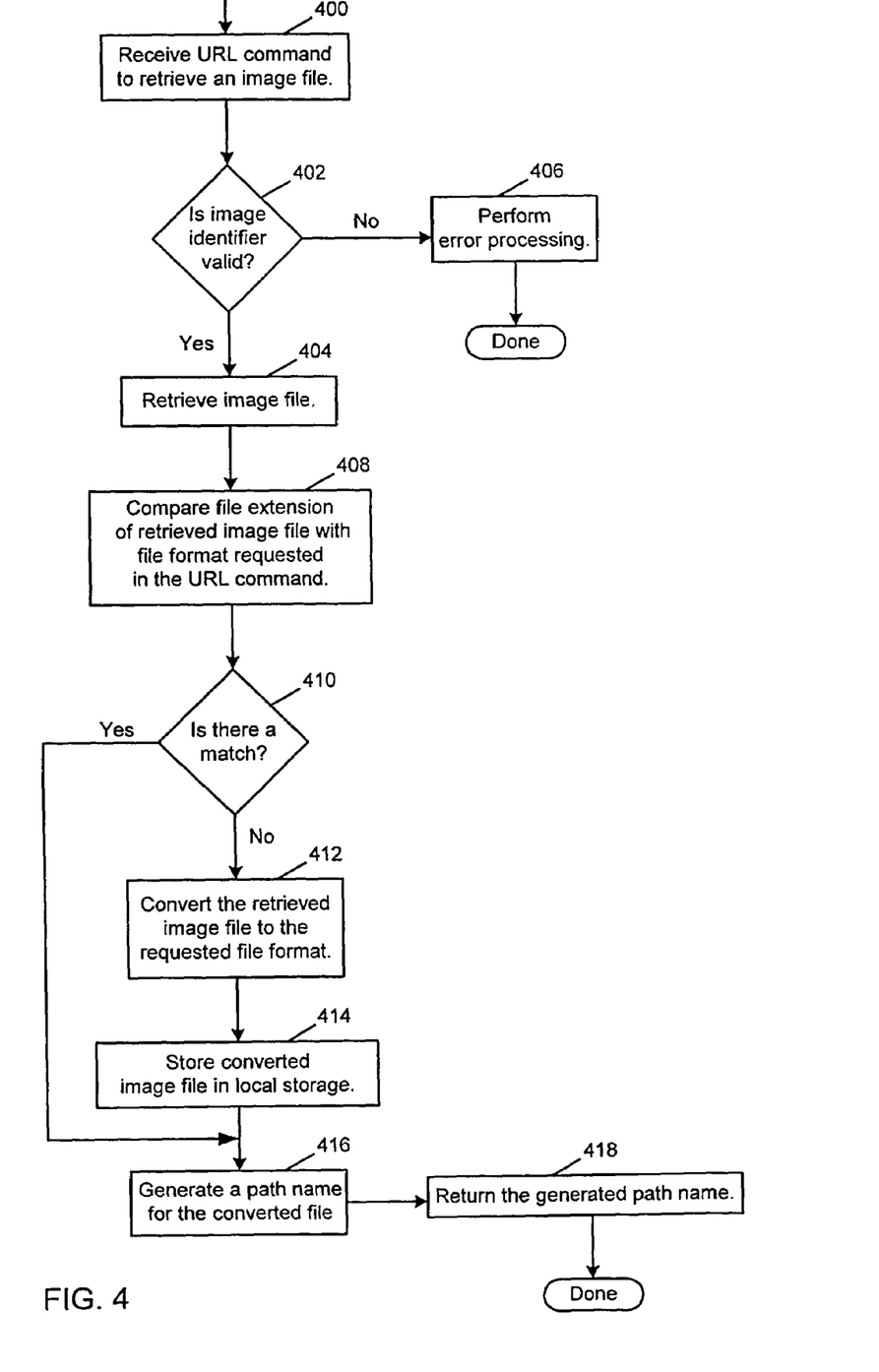
FIG. 4 is an exemplary flow diagram illustrating the steps performed by the universal image format solution to process a request for an image file.

FIG. 4 is an exemplary flow diagram illustrating the steps performed by the universal image format solution 112 to process a request for an image file. In Block 400, the universal image format solution 112 receives a URL command to retrieve an image file. In Block 402, the universal image format solution 112 determines whether the image identifier provided in the URL command is valid. If it is valid, the universal image format solution 112 continues to Block 404, otherwise, the universal image format solution 112 continues to Block 406 and performs error processing.

In Block 404, the universal image format solution 112 retrieves the image file. In Block 408, the universal image format solution 112 compares the file extension of the retrieved image file with the file format requested in the URL command. In Block 410, the universal image format solution 112 determines where there is a match between the file extension of the retrieved image file with the file format requested in the URL command. If there is a match, the universal image format solution 112 continues to Block 416, otherwise, the universal image format solution 112 continues to Block 412.

In Block 412, the universal image format solution 112 converts the retrieved image file to the requested file format. In Block 414, the universal image format solution 112 stores the converted image file in local storage at a server. In Block 416, the universal image format solution 112 generates a path name that can be used by a Web browser to locate the converted file. In Block 418, the universal image format solution 112 returns the generated path name.

Image Data Preparation

In one embodiment of the invention, the image file is loaded into a data storage device in a particular manner that allows for searching for the file and retrieving the file in the manner described above. However, one skilled in the art will recognize that the concepts of the invention may be applied to different data storage devices and files stored in a different manner than described herein.

Figure 3:
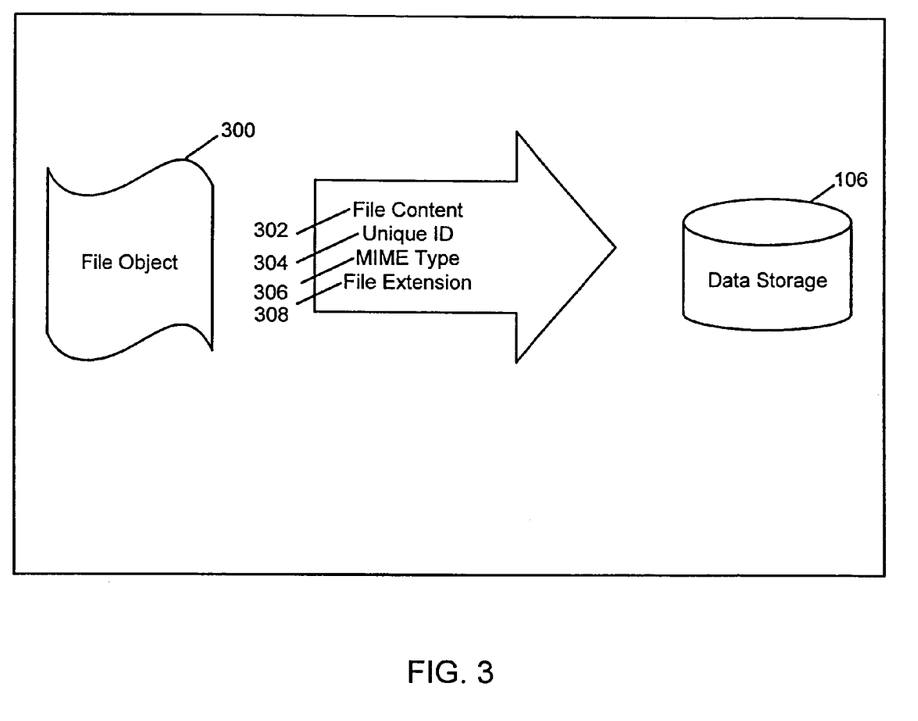
FIG. 3 is an exemplary diagram illustrating the data structure of each file object (i.e., image object) that is loaded into data storage.

FIG. 3 is an exemplary diagram illustrating the data structure of each file object (i.e., image object) 300 that is loaded into data storage 106. Each image object 300 consists of four parts: file content 302, unique identifier (ID) 304, MIME type 306, and file extension 308. The file content 302 is the file itself to be stored inside data storage 106. The unique ID 304 is the search key for the image object and is used to search for the image object. The MIME type 306 and file extension 308 are the operands for file extension comparison operations. In particular, the MIME type is a multipurpose Internet mail extension. Some examples are the following:

| HTML document: | text/html |
|---|---|
| Movie: | video/mpeg |
| GIF Image: | image/gif |
| JPEG image: | image/jpeg |

The Digital Library

In one embodiment of the invention, the advanced database for storing image files is the DB2 Digital Library Version 2 ("Digital Library") from International Business Machines, Corporation. The Digital Library provides an end-to-end solution for managing multimedia content. The Digital Library enables users to reach new markets and establish new sources of revenue through improved management and reuse of media assets; preserve assets from physical deterioration; protect assets with advanced rights management; consolidate management of text, images, audio and video with easier, faster access; save money with electronic delivery; and, be ready for Year 2000.

The Digital Library may help businesses and institutions in the areas of higher education, media and publishing, entertainment, culture, health, and commerce, provide greater access to their digital assets, while enhancing their growth and new revenue opportunities. The Digital Library enables petabytes of text, images, audio and video, to be created or transformed into digital form and distributed over any network, with security, to users around the world.

The Digital Library has the following advantageous features:

Enhanced platform support now includes Windows NT and Macintosh     Multi-language development tools     Enhanced rights management     Integrated multi-search capability     Integrated support for IBM media servers     Java-based system administration interface     Easier installation with graphical user interface guides     IBM DB2 Universal Database components The fundamental market shift from analog to digital has created a new competitive environment that is changing the business is transacted. From media production groups to print and Web publishers; from research and teaching to distance education; from the fast-paced world of television news to Hollywood studios, it's digital media that is driving the change. This digital media may be text, full-motion video, audio, graphics, or images. Whatever its form, the challenge is to provide media asset solutions with sufficient storage capacity, scalability, speed, multi-level security, sophisticated searching techniques and Internet access to reach new markets, preserve assets from loss or deterioration, and ensure copyright protection.

The Digital Library integrates the technologies of information capture, storage management, search and retrieval, and secure distribution into a single offering. The Digital Library provides a solution framework to allow companies to build digital libraries using their choice of client and server platforms; then to distribute their content, with security and intelligent management, to users around the world.

The Digital Library provides a sophisticated end-to-end solution for maximizing the value of multimedia assets. It can be used to create customer-specific solutions in any industry.

Integrated multi-search capability lets a user develop Web-based and desktop Digital Library applications using APIs in Java, C++, C or Active X that combine catalog and text searches in a single query. A sample Java applet which demonstrates this multi-search capability comes with the Digital Library. This capability includes the following features:

Search images by color average, distribution, position and image texture     Search and retrieve documents in multiple languages with support for single and double byte languages     Fuzzy and phonetic searches     Ability to search stored objects, including parametric and full text     Search with Boolean logic by single word, phrase or multiple terms Use of natural language when specifying a query Relevance ranking of search results Clustering of results list A user can protect intellectual property with enhanced rights management functions, including watermarking techniques for bi-level and color images, and data hiding for images.

Extensive and customizable access control that supports secured access to object servers Image watermarking using a user's own unique mark IBM plans to support secure content delivery in a future release A user can use the improved Java-based system administration tool to perform IBM DB2 Digital Library system administration tasks through the Internet or from the desktop.

Access to the contents of the IBM DB2 Digital Library through Web browsers

Support for developing new Internet applications using Java applets and APIs for Java, C++, C and Active X.

The Digital Library is highly scalable and has the following features:

Ability to grow from a single workstation to a networked enterprise-wide solution Collections can be maintained on a single PC hard drive, then grow to being managed by storage servers containing terabytes or even petabytes of data.

Use of networked IBM Tape Library and Optical Library units under System Managed Storage control Use of RS/6000 configurations with multiple Object Server nodes, fast switching and high availability Multiple distributed Object Storage Servers, allowing:

the selection of specialized server types that are best suited to the storage and distribution of a particular data type the location of servers to be placed close to users to reduce network demands and improve user response time storage of multiple parts of a single digital asset on different Object Servers Multi-language development tools help a user develop Digital Library applications which can create, query and update data managed by the Digital Library. They support the use of a variety of APIs, including Java, C++, C and Active X. The applications can access IBM DB2 Digital Library data via the Internet or desktops on the AIX and Windows platforms.

Content independent storage and distribution of digital assets

Client/Server design that allows intermixing different platforms within the same solution A wide range of heterogeneous clients that can be intermixed as needed Interfaces for an organization's existing data distribution methods as well as many popular authoring tools The Query By Image Content (QBIC) technology allows a user to search for images by color percentages, distribution, position and image texture. And the image search capability may be used with catalog and text searches as part of the integrated multi-search.

The integrated digital media object management is available using media servers. The Digital Library Media Manager works with the IBM VideoCharger Server for AIX product to deliver streaming digital audio and MPEG video objects over the Internet.

The Digital Library contains selected components of IBM DB2 Universal Database Version 5 that may be installed and used exclusively to support IBM DB2 Digital Library.

Improved installation is made possible by a graphical user interface which guides a user through the installation of IBM DB2 Digital Library quickly and efficiently.

Online help is delivered in HTML to easily view from an included Web browser. Clicking on help automatically opens the browser and takes a user to the appropriate help topic. All the books are available on one CD-ROM and can be printed or viewed online.

When used in accordance with its associated documentation, IBM DB2 Digital Library is capable of correctly processing, providing and/or receiving data within and between the 20th and 21st centuries, provided all other products used with the product properly exchange date data with it.

The IBM DB2 Digital Library architecture is based on a triangular client/server model comprised of a Library Server, one or more multimedia Object Servers, and one or more clients. The core of the infrastructure is the Library Server. The Library Server, using IBM DB2 or Oracle database services, manages the IBM DB2 Digital Library catalog information, locates stored objects using a variety of search technologies, provides secured access to the objects held in the collection, and communicates with the Object Servers. The digital content is stored in Object Servers. Objects Servers support the attachment of DASD and other media devices, and can be distributed across an enterprise network to provide convenient user access. The end user, on a client desktop, receives direct access to the information requested from the collection regardless of where the data is stored. Many clients can be connected to the Library and Object Server in an IBM DB2 Digital Library system, including those accessing the IBM DB2 Digital Library using supported Web browsers.

The five integrated functions of IBM DB2 Digital Library enable the collection, organization, storage and management, protection and distribution of multimedia objects.

Digital content from diverse sources can be incorporated into IBM Digital Library by integrating existing tools or importing information. IBM Digital Library Version 2 supports an array of industry-standard scanners and provides the capability to define and import many data formats. Authoring tools from IBM and other vendors can be used to create new digital information to be managed by an IBM DB2 Digital Library. Single point-of-entry business application access can be developed using the APIs provided.

The distributed design supports a full range of platforms, and provides the flexibility and granularity to add server and client capacity where and when it is needed. Enterprise-wide distributed access to library index information and isolating the client-application from the Object Servers provides optimal control and security. Where multiple users require local access to the same data, objects can be cached on Object Servers to improve performance.

IBM DB2 Universal Database technology provides IBM DB2 Digital Library the capability to operate in open, heterogeneous environments delivering industrial-strength levels of integrity, data access, high-volume data management and central-system administration. IBM DB2 Digital Library can also use Oracle database management system for the AIX environment.

IBM DB2 Digital Library enables the parametric search of metadata entries associated with an object and offers the ability to search the content of stored objects. When a text or image object is stored, indexing information can be created; and IBM DB2 Digital Library provides a rich portfolio of search technology for text and image objects. For example, users can query by keyword or Boolean text search, or by image textures and shapes; and they can combine the keyword, text, and image using the multi-search capability. They can express queries in natural language, and the searches return a list of ranked results.

IBM DB2 Digital Library rights management functions control access and help prevent the unauthorized use of intellectual property content. IBM DB2 Digital Library offers the industry's leading rights management technology for authentication, encryption, bailing, and payment systems.

IBM DB2 Digital Library is a technology platform for a wide variety of solution offerings including:

IBM Media Director—Integrates with digital audio workstations to provide audio professionals with network access to, and advanced management for, more than 100,000 hours of audio files.

Imagine Products' The Executive Producer—is a full-function video logging and archiving system with automatic scene detection.

IBM Media Management System—an integrated Web-based solution for the automated storage and retrieval of video stock footage, audio, still images and film scripts.

IBM DB2 Digital Library Collection Treasury—enables cultural institutions to provide online access to valuable original holdings while managing appropriate restrictions on audience access and the reuse of images.

Dewey's greatest invention, the decimal system, was something we all learned in elementary school. Now most libraries use the Library of Congress cataloging system. But mining for information through the mixed-media objects in a digital library required yet another new way of looking at things. Catalog systems only point library users to where the information is located. But IBM DB2 Digital Library uses powerful search and access technologies that help users look at the content to find what they want quickly, accurately and intuitively.

IBM DB2 Digital Library solutions provide content-independent data storage that allows for many kinds of objects to be stored in a scalable archive. Many kinds of media objects that a user wants to access are categorized differently in a manner that's appropriate for each object type. For example, a book can be categorized by title, author or subject. A movie can be categorized by producer, director or theme. If a user is looking for a certain object type, a parametric search looks for metadata entries like author, subject, title, length and the like.

Conventional technology only allows a user to query by keyword, which sends back a list of entries containing that word in its index. IBM's rich portfolio of search technology includes sophisticated tools for text and image analysis. IBM DB2 Digital Library offers natural language query-permitting users to express queries in simple, natural style without concern for exact word positioning. This type of query returns a ranked list, with highest probability of relevance at the top of the list. Textual analysis of words is also performed, for instance, a distinction is made between "White House" and "white house", yet an association is recognized between "IBM" and "International Business Machines Corporation".

The above text mining functions are augmented with further content-based search capabilities, providing tools such as clustering and abstracting techniques for organizing information.

Since an array of multimedia is typically found in a digital library collection, users need to search using more than just language. Query By Image Content (QBIC), IBM's award winning image search technology, allows users to search a collection's media objects by color percentage, distribution, position and image texture expressed graphically, for example, by specifying colors from a color palette or selecting textures from a display of sample images. IBM DB2 Digital Library technology is expanding to include video searching by moving image content.

What's important to remember is that IBM DB2 Digital Library is open. The actual make-up of one digital library can be quite different from another. The search and access power "under the hood" of IBM DB2 Digital Library enables content authors, editors, scholars, users and curiosity seekers to extract the information they need.

Where Search & Access leaves off, the distribution of digital library materials across both internet and networks begins.

Because IBM DB2 Digital Library can provide access to users through any existing computer network, the audience for information is finally, truly global. IBM DB2 Digital Library is open and its content can be distributed directly to users via private networks, a user's intranet, the World Wide Web or interactive TV. This capability represents IBM's commitment to e-business computing, for worldwide information and data exchange.

For many IBM DB2 Digital Library solutions, the IBM Global Network provides a secure, reliable medium for distribution and access to a collection. However, the flexibility of IBM DB2 Digital Library means a user will not be locked into any single distribution medium. And, the distributed information can be viewed and presented using any computer system with a graphical user interface.

Digitalized content, such as images, audio and video, is large in size relative to many existing network capabilities. Moreover, real-time delivery of audio and video is dependent on a network that can assure paced and continuous delivery. IBM has developed extensive advanced networking capabilities, such as Asynchronous Transfer Mode (ATM) switches and network management software, to assist in digital and analog information delivery.

The definition of content ownership is not universal. Copyrights may be protected in one country and practically ignored in the next. So how does a user protect intellectual property rights in a digital library that anyone with a PC can learn to use in a few minutes? Rights Management is the answer. IBM has concentrated on Rights Management as a key factor in creating IBM Digital Library and allowing a user to develop a full digital library solution to meet business needs.

The challenge is to provide ease of use, privacy, content integrity and cost utility for users while establishing bullet-proof Rights Management solutions for content owners. To meet that challenge, IBM DB2 Digital Library incorporates the rich legacy of IBM's innovations in networking security and transactions technology.

Compare using IBM DB2 Digital Library to making a withdrawal from an automated banking machine. A user is identified, enters a password, requests information or an object, and the system checks the request against the user's eligibility. Upon approval the requested objects can be watermarked to deter illegal duplication. And the entire process is conducted in a secure environment without the threat of intrusion. Meanwhile, compensation for the value added to the information or object is duly processed.

IBM DB2 Digital Library can authenticate original media—photos, manuscripts, audio, video, film and images—by using electronic signatures. Digital content can be recognized as authentic with these signatures. Watermarks, a form of electronic signature currently in use throughout several IBM DB2 Digital Library solutions, are encoded onto photos, films, images and manuscripts. Visible watermarks can be graphically representative of a content owner's identity, like a logo or crest. Watermarks are sophisticated identifiers that inhibit the misappropriation of content owners' assets while assuring users' confidence in the authenticity of the content.

IBM's e-business Cryptolope Live! product represents a giant leap forward in distribution for both content owners and users. The Cryptolope an encryption-protected "envelope" that can travel on public networks.

Anybody who wants to open a Cryptolope to read its contents must use a key to unlock it. Users can preview a Cryptolope's contents, then decide whether to pay for the key. For sensitive content needing increased security, a Cryptolope may require several keys. And a Cryptolope can travel on networks with only the intended recipient being aware of its presence. All the while, the IBM e-business service keeps impeccable records of rights payments transacted.

IBM DB2 Digital Library relies on Cryptolope technology for its Rights Management capabilities. With multimedia assets, the work of several content authors is contained within a single media object. For instance, a digitized document might contain a photo, an illustration, a page of text and some music—each authored by a different person who should be compensated. Furthermore, a customer accessing this document might not be required to purchase the entire work, but rather just the individual section that is accessed. Cryptolope technology, the cornerstone of IBM DB2 Digital Library strategy for Rights Management, offers discreet recognition for each content author, keeping track of who gets paid for what.

IBM DB2 Digital Library provides trusted means for protecting and managing the rights of content owners. Rights Management issues impacts every aspect of IBM DB2 Digital Library.

The conversion from paper, tape and film to bits and bytes saves masses of physical space, it's true. But there remains a price to be paid in storage capacity and performance. IBM DB2 Digital Library provides high-performance, scalable storage and management of information in an open environment, across a broad spectrum of platforms.

The key to effectively storing and managing information—especially massive amounts of multimedia data—is the enrichment of the digitized objects so that they can be efficiently organized for search. IBM DB2 Digital Library's information management features include automated indexing, foldering, correlation, feature extraction and translation functions.

Two other key features of IBM DB2 Digital Library are openness and scalability. IBM Digital Library is an open framework of hardware and software which can be implemented across the full range of platforms, including NT, AIX and OS/390. And IBM DB2 Digital Library provides a powerful and scalable technology base that will grow easily as needs grow—to see projects through from initial production to full-scale implementation.

Drawing from IBM's legacy of managing information, IBM DB2 Digital Library has developed a unique architecture for managing the storage of objects. At the core of the IBM DB2 Digital Library storage and management infrastructure is a library server which manages catalog information and provides pointers to the objects held in the collection. Object servers contain the actual digitize content files of a digital library, such as a video clip. The client (or end user) receives a direct path to the information requested from the collection while the data contained in the digital library is protected from random user access. With this triangle architecture the library server prevents unauthorized people from getting to the object servers. The data for digitized images, music and video tends to be large. Storing frequently used objects close to their users reduces communication costs and improves performance since the number of times the object is relayed is minimized.

In an IBM DB2 Digital Library solution, objects may be prestored and retrieved upon request. IBM DB2 Digital Library solutions provides an open set of application interfaces for access to servers, interaction with servers and the delivery of objects to clients. Objects can be delivered directly to a client so that a file is placed on a workstation ready for reuse. In addition, objects can be delivered and launched at the client level, so that, for example, a text object that's delivered in WordPerfect format is activated in WordPerfect on the user's desktop. Likewise, a graphical image in Lotus Freelance can be activated in Lotus Freelance on the user's desktop.

IBM DB2 Digital Library provides for hierarchical storage management. Digital objects can be stored where people want them. High profile objects that are most likely to be accessed often may be stored on spinning disk, while objects less likely to be accessed are migrated off to tape or optical storage. The result is cost savings in storage maintenance. IBM DB2 Digital Library is open to a wide range of storage devices to ensure delivery of information on demand.

The cost of converting source materials into digital information means the storage architecture of IBM DB2 Digital Library must withstand the rigors of time and continuous use. Only IBM can boast the legacy of reliability and system stability that all digital libraries need to insure against the catastrophe that any breakdown would surely cause.

After defining the scope of a digital library, a user should consider the Search & Access functions that allow users to quickly and conveniently find the information they need.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of accessing data at a server computer from a client computer connected to the server computer via a network, the data being stored on a data storage device connected to the server computer, the method comprising the steps of:

receiving, at the server computer, a request for data from the client computer in the form of a universal resource locator (URL) command, the URL command including a file identifier for identifying a file containing the requested data and a file format for the file, wherein the client computer can access the file having the file format;

determining, at the server computer, whether the file identifier is valid;

if the file identifier is determined to be valid, retrieving, at the server computer, the requested data from the data storage device in response to the request for data from the client computer;

after retrieving the requested data from the data storage device, determining, at the server computer, whether the client computer can access the retrieved data in its retrieved form;

if it is determined that the client computer cannot access the retrieved data in its retrieved form, automatically converting, at the server, the retrieved data into converted data that the client computer can access; and returning a locator to the client computer for locating the converted data.

2. The method of claim 1, wherein the step of determining whether the client computer can access the retrieved data in its retrieved form further comprises comparing the file format specified by the URL command to a file extension of the retrieved file.

3. The method of claim 2, wherein the step of automatically converting the retrieved data into converted data that the client computer can access further comprises converting the retrieved file to the file format specified by the URL command.

4. The method of claim 1, further comprising the steps of:
storing the converted data at the server computer; and
generating a path name to locate the stored converted data.

5. The method of claim 4, wherein the locator comprises the path name.

6. The method of claim 4, wherein the client computer has a Web browser, and further comprising the step of, under control of the Web browser, retrieving the stored converted data from the server computer using the generated path name.

7. The method of claim 4, further comprising the step of deleting the stored converted data after a predetermined period of time.

8. The method of claim 1, wherein the client computer has a Web browser, and further comprising the step of, under control of the Web browser, retrieving the converted data from the server computer using the locator.

9. An apparatus for accessing data from a server computer, comprising:
a server computer having a data storage device connected thereto, wherein the data storage device stores data;
a client computer connected to the server computer; and
one or more computer programs, performed by the server computer via a network, for receiving a request for data from the client computer in the form of a universal resource locator (URL) command, the URL command including a file identifier for identifying a file containing the requested data and a file format for the file, wherein the client computer can access the file having the file format; determining whether the file identifier is valid: if the file identifier is determined to be valid, retrieving the requested data from the data storage device in response to the request for data from the client computer; after retrieving the requested data from the data storage device, determining whether the client computer can access the retrieved data in its retrieved form; if it is determined that the client computer cannot access the retrieved data in its retrieved form, automatically converting the retrieved data into converted data that the client computer can access; and returning a locator to the client computer for locating the converted data.

10. The apparatus of claim 9, wherein the program for determining whether the client computer can access the retrieved data in its retrieved form further comprises means for comparing the file format specified by the URL command to a file extension of the retrieved file.

11. The apparatus of claim 10, wherein the program for automatically converting the retrieved data into converted data that the client computer can access further comprises means for converting the retrieved file to the file format specified by the URL command.

12. The apparatus of claim 9, further comprising:
means for storing the converted data at the server computer; and
means for generating a path name to locate the stored converted data.

13. The apparatus of claim 12, wherein the locator comprises the path name.

14. The apparatus of claim 13, wherein the client computer has a Web browser, and further comprising means for, under control of the Web browser, retrieving the stored converted data from the server computer using the locator.

15. The apparatus of claim 12, further comprising means for deleting the stored converted data after a predetermined period of time.

16. The apparatus of claim 9, wherein the client computer has a Web browser, and further comprising the step of, under control of the Web browser, retrieving the converted data from the server computer using the generated path name.

17. The apparatus of claim 9, wherein at least one of said one or more computer programs are performed by the server computer for controlling access to the data stored on the data storage device.

18. The apparatus of claim 9, wherein at least one of said one or more programs are performed by the server computer for authenticating the data stored on the data storage device.

19. An article of manufacture comprising a computer program carrier readable by a client computer and tangibly embodying one or more instructions executable by the client computer to perform method steps for accessing data at a server computer from a client computer connected to the server computer via a network, the data being stored in a data storage device connected to the server computer, the method comprising the steps of:

receiving, at the server computer, a request for data from the client computer in the form of a universal resource locator (URL) command, the URL command including a file identifier for identifying a file containing the requested data and a file format for the file, wherein the client computer can access the file having the file format;

determining, at the server computer, whether the file identifier is valid;

if the file identifier is determined to be valid, retrieving, at the server computer, the requested data from the data storage device in response to the request for data from the client computer;

after retrieving the requested data from the data storage device, determining, at the server computer, whether the client computer can access the retrieved data in its retrieved form;

if it is determined that the client computer cannot access the retrieved data in its retrieved form, automatically converting, at the server, the retrieved data into converted data that the client computer can access; and returning a locator to the client computer for locating the converted data.

20. The article of manufacture claim 19, wherein the step of determining whether the client computer can access the retrieved data in its retrieved form further comprises comparing the file format specified by the URL command to a file extension of the retrieved file.

21. The article of manufacture of claim 20, wherein the step of converting the retrieved data into converted data that the client computer can access further comprises converting the retrieved file to the file format specified by the URL command.

22. The article of manufacture of claim 19, further comprising the steps of:

storing the converted data at the server computer; and generating a path name to locate the stored converted data.

23. The article of manufacture of claim 22, wherein the locator comprises the path name.

24. The article of manufacture of claim 23, wherein the client computer has a Web browser, and further comprising the step of, under control of the Web browser, retrieving the stored converted data from the server computer using the locator.

25. The article of manufacture of claim 22, further comprising the step of deleting the stored converted data after a predetermined period of time.

26. The article of manufacture of claim 19, wherein the client computer has a Web browser, and further comprising the step of, under control of the Web browser, retrieving the converted data from the server computer using the generated path name.

* * * * *